(12) United States Patent
Nishikawa et al.

(10) Patent No.: US 7,843,599 B2
(45) Date of Patent: Nov. 30, 2010

(54) IMAGE PROCESSING METHOD AND IMAGE PROCESSING APPARATUS

(75) Inventors: Hiromitsu Nishikawa, Tokyo (JP); Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1223 days.

(21) Appl. No.: 10/627,657

(22) Filed: Jul. 28, 2003

(65) Prior Publication Data

US 2004/0070777 A1 Apr. 15, 2004

(30) Foreign Application Priority Data

Jul. 31, 2002 (JP) ............... 2002-224162

(51) Int. Cl.
- *G03F 3/00* (2006.01)
- *H04N 1/54* (2006.01)
- *H04N 1/56* (2006.01)
- *H04N 1/60* (2006.01)
- *H04N 1/409* (2006.01)
- *G09G 5/06* (2006.01)

(52) U.S. Cl. ............ 358/1.9; 358/3.23; 358/515; 358/523; 358/525; 358/3.27; 358/518; 358/529; 358/530; 382/264; 382/167; 382/162; 345/593; 345/600; 345/601; 345/602; 345/603; 345/604

(58) Field of Classification Search .......... 358/1.9, 358/3.23, 515, 523, 525, 3.27, 518, 529, 358/530; 345/593, 600–604; 382/264, 167, 382/162
See application file for complete search history.

(56) References Cited

U.S. PATENT DOCUMENTS

| 4,929,978 | A | * | 5/1990 | Kanamori et al. ............ 355/38 |
| 5,121,196 | A | | 6/1992 | Hung .......................... 358/75 |
| 5,172,223 | A | * | 12/1992 | Suzuki et al. ............... 358/529 |
| 5,508,827 | A | * | 4/1996 | Po-Chieh .................... 358/518 |
| 5,633,662 | A | * | 5/1997 | Allen et al. ................. 347/15 |
| 5,687,300 | A | * | 11/1997 | Cooper ....................... 358/1.9 |
| 5,739,828 | A | * | 4/1998 | Moriyama et al. ............ 347/9 |

(Continued)

FOREIGN PATENT DOCUMENTS

JP 2-136848 5/1990

(Continued)

OTHER PUBLICATIONS

Office Action dated Jun. 5, 2009 in JP 2002-224162.

*Primary Examiner*—David K Moore
*Assistant Examiner*—Beniyam Menberu
(74) *Attorney, Agent, or Firm*—Fitzpatrick, Cella, Harper & Scinto (57) ABSTRACT

For each combination of color material signals corresponding to an input image signal, a total color material use amount is calculated. On the other hand, on the basis of a predetermined target color, total color material use amounts are set which vary smoothly in accordance with a variation in the target color. Then, a determination is made as to which one of all the combinations of color material signals determined as described above corresponds to one of the set total color material use amounts which is the same as the total color material use amount corresponding to the input image signal. This combination is outputted to a printer as the optimum combination of color material signals corresponding to the input image signal.

12 Claims, 10 Drawing Sheets

U.S. PATENT DOCUMENTS

| | | | | |
|---|---|---|---|---|
| 5,982,990 | A * | 11/1999 | Gondek | 358/1.9 |
| 6,058,207 | A * | 5/2000 | Tuijn et al. | 382/162 |
| 6,081,344 | A * | 6/2000 | Bockman et al. | 358/1.9 |
| 6,164,746 | A * | 12/2000 | Akahira et al. | 347/15 |
| 6,169,609 | B1 * | 1/2001 | Jacob et al. | 358/1.9 |
| 6,172,692 | B1 * | 1/2001 | Huang et al. | 347/43 |
| 6,262,810 | B1 * | 7/2001 | Bloomer | 358/1.9 |
| 6,278,533 | B1 * | 8/2001 | Takemoto | 358/521 |
| 6,340,975 | B2 * | 1/2002 | Marsden et al. | 345/590 |
| 6,377,366 | B1 * | 4/2002 | Usami | 358/520 |
| 6,378,033 | B1 | 4/2002 | Nishikawa | 711/103 |
| 6,435,657 | B1 * | 8/2002 | Couwenhoven et al. | 347/43 |
| 6,480,299 | B1 * | 11/2002 | Drakopoulos et al. | 358/1.9 |
| 6,577,826 | B1 * | 6/2003 | Misaizu et al. | 399/45 |
| 6,637,849 | B2 * | 10/2003 | Maltz | 347/15 |
| 6,721,063 | B1 * | 4/2004 | Harrington | 358/1.9 |
| 6,808,244 | B2 * | 10/2004 | Rosenberger et al. | 347/15 |
| 6,822,757 | B1 * | 11/2004 | Usami et al. | 358/1.9 |
| 6,997,543 | B2 * | 2/2006 | DeBaer | 347/43 |
| 7,012,714 | B2 | 3/2006 | Higashikata et al. | |
| 7,032,989 | B2 * | 4/2006 | Nishikawa | 347/19 |
| 7,102,785 | B2 * | 9/2006 | Tamagawa | 358/1.9 |
| 7,190,485 | B2 * | 3/2007 | Couwenhoven et al. | 358/1.9 |
| 7,196,823 | B2 * | 3/2007 | Hagai et al. | 358/3.23 |
| 7,245,395 | B2 * | 7/2007 | Couwenhoven et al. | 358/1.9 |
| 2001/0035968 | A1 * | 11/2001 | Higashikata et al. | 358/1.9 |
| 2002/0021458 | A1 | 2/2002 | Saito et al. | 358/515 |
| 2002/0105659 | A1 * | 8/2002 | Rozzi | 358/1.9 |
| 2003/0002058 | A1 * | 1/2003 | Couwenhoven et al. | 358/1.9 |
| 2003/0072473 | A1 | 4/2003 | Livens et al. | 382/112 |
| 2003/0076516 | A1 | 4/2003 | Saito | 358/1.9 |
| 2003/0090713 | A1 | 5/2003 | Saito | 358/1.15 |
| 2003/0202197 | A1 | 10/2003 | Saito et al. | 358/1.9 |
| 2003/0202213 | A1 | 10/2003 | Saito | 358/1.18 |
| 2003/0234946 | A1 | 12/2003 | Saito | 358/1.9 |
| 2004/0027406 | A1 | 2/2004 | Nishikawa et al. | 347/19 |
| 2005/0151788 | A1 * | 7/2005 | Yao et al. | 347/43 |
| 2005/0151789 | A1 * | 7/2005 | Yao et al. | 347/43 |

FOREIGN PATENT DOCUMENTS

| | | |
|---|---|---|
| JP | 6-242523 | 9/1994 |
| JP | 2002-10096 | 1/2002 |

* cited by examiner

IMAGE PROCESSING METHOD AND IMAGE PROCESSING APPARATUS

This application claims priority from Japanese Patent Application No. 2002-224162, filed Jul. 31, 2002, which is incorporated herein by reference.

BACKGROUND OF THE INVENTION

1. Field of the Invention

The present invention relates to an image processing method and an image processing apparatus, and particularly to a process of determining a conversion relationship relating to data generation for a plurality kinds of color material such as ink used in an image output apparatus such as an ink jet printer, the process of determining being executed by taking account of use amounts of the plurality of kinds of color material.

2. Description of the Related Art

In general, when an image output apparatus such as a printer is used to print and output a color image, four color materials, for Y (Yellow), M (Magenta), C (Cyan), and K (black), are used. For example, an ink jet printer uses Y, M, C, and K inks, while a copy machine or a printer based on electrophotography uses Y, M, C, and K toners.

A color space realized by these color materials, used in the image output apparatus, is normally different from a color space for original image data. Thus, in the field of image processing in which color material data is generated on the basis of image data, various image processing methods have been proposed to reproduce faithfully colors or gradations shown by the original image data or to reproduce desired colors and the like.

Among these image processing methods, for example, Japanese Patent Application Laid-Open No. 2-136848 (1990) describes an image processing method that can eliminate the color reproducibility problem associated with a 100% UCR (Under-Color Removal) process executed as a part of the color material data generating process. In this method, of various combinations of Y, M, C, and K which can express a color shown by the original image data, those in which K has the highest density are defined to be the combination of Y, M, C, and K. According to this method, in contrast to the 100% UCR, where whichever one of Y, M, and C has the lowest density is replaced with K and consequently itself has a value of 0, combinations of Y, M, C, and K which do not include a value of 0 are permitted to be present. Consequently, an image with no decrease in a saturation or density can be outputted. Furthermore, compared to the image processing described in the above publication, Japanese Patent Application Laid-Open No. 6-242523 (1994) describes an image processing method of setting a value for K taking into account the reproduction ranges of the color materials Y, M, C, and K, a pseudo-contour of an output image, interpolation accuracy, and the like to obtain a further improvement in reproducibility.

However, even if image processing is executed so as to improve the reproducibility of the image output apparatus such as a printer as described above, actual printing in the printer or the like becomes improper owing to the relationship between the color materials and printing sheets. As a result, images cannot be reproduced as desired.

For example, in a process of paying attention only to the amount of K to set the amounts of the color materials Y, M, C, and K of a combination as described in the above publication, the amounts of the three color materials Y, M, and C are basically not associated with a predetermined target color as a condition that determines this combination. As a result, for example, the amounts of the three color materials Y, M, and C may vary rapidly relative to the target color, resulting in false contours.

Further, if the use amounts of the color materials cannot be ensured to vary smoothly, then for some combinations of plurality kinds of color material, the total use amount of color materials may increase greatly. In this case, for example, an ink jet printer cannot sufficiently absorb ink to a printing sheet depending on the ink absorption characteristics of the printing sheet. Thus, ink may overflow or bleed to hinder the density or the like from being accurately realized. Further, an electro-photographic printer using toner possibly cannot sufficiently fix the toner to the printing sheet, depending on the toner adhesion characteristics of the sheet. Again, the density cannot be accurately realized. For example, if the maximum amount of one color material is assumed to be 100% and a relatively dark color is printed which has signal values indicating that the amount of each color material has the maximum value, the total amount of color materials applied to the printing sheet is 400%. Where, as in this case, each of the four color materials is used at an amount close to its maximum value, then with the ink jet printer or the like, the printing sheet cannot absorb four types of inks applied so as to be superimposed on one another. Further, with the electro-photographic printer using toner, four color toners cannot be appropriately fixed to the printing sheet. As a result, the colors cannot be accurately reproduced.

SUMMARY OF THE INVENTION

The object of the present invention is to provide an image processing method and an image processing apparatus which generate data for a plurality of kinds of color materials such as ink or toner by determining combinations of data for the plurality of kinds of color materials under a condition that a total use amount of the color materials varies smoothly and which enables determining of a conversion relationship associated with the data generation.

In the first aspect of the present invention, there is provided an image processing method of generating color material data for using a plurality of kinds of color material to output an image, the method comprising the steps of:

inputting an image signal; and generating a combination of the color material data for the plurality kinds of color material so that a total color material use amount of the plurality kinds of color material, which is determined according to the combination of the plurality kinds of color material corresponding to the inputted image signal, meets a smooth function for the total color material use amount within a range of the image signal that can be inputted.

In the second aspect of the present invention, there is provided an image processing apparatus for generating color material data for using a plurality kinds of color material to output an image, comprising:

input means for inputting an image signal; and data generating means for generating a combination of the color material data for the plurality kinds of color material so that a total color material use amount of the plurality of kinds of color material, which is determined according to the combination of the plurality of kinds of color material corresponding to the inputted image signal, meets a smooth function for the total color material use amount within a range of the image signal that can be inputted.

With the above arrangement, the combination of data for the plurality of kinds of color material which data corresponds to an inputted image signal is generated so that the total amount of plurality of kinds of color material determined depending on the combination of the data meets a smooth function for the total color material use amount within the range of an image signal that can be inputted. Consequently, when an image is outputted to a printing medium such as a printing sheet, sharp changes can be prevented such as an discontinuous variation in color material use amount in the case that a variation in the density or hue of the image is to be realized.

The above and other objects, effects, features and advantages of the present invention will become more apparent from the following description of the preferred embodiments thereof taken in conjunction with the accompanying drawings.

DETAILED DESCRIPTION OF THE PREFERRED EMBODIMENTS

The preferred embodiments of the present invention will be described below with reference to the drawings.

First Embodiment

Figure 1:
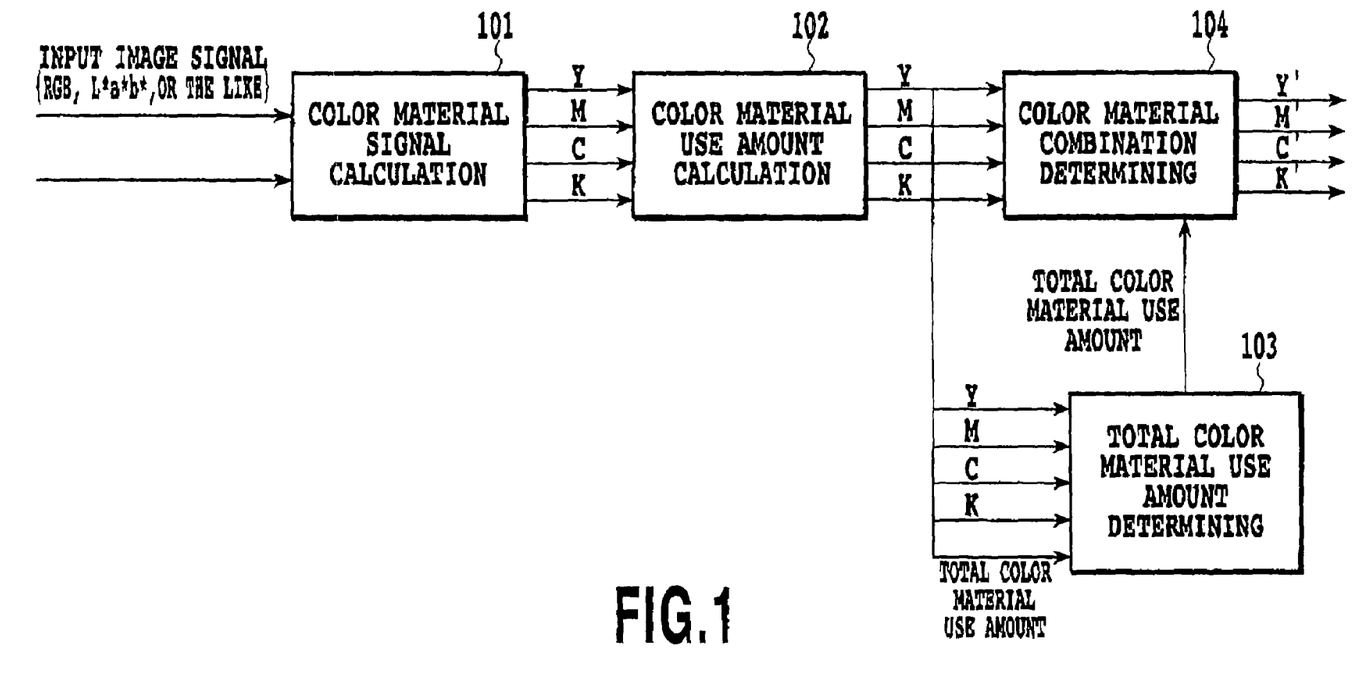
FIG. 1 is a block diagram showing an image processing configuration in a color printer according to an embodiment of the present invention.

FIG. 1 is a block diagram showing an image processing configuration for a color printer according to an embodiment of the present invention. This figure shows a process of receiving a predetermined input image signal to generate data for color materials Y (Yellow), M (Magenta), C (Cyan), and K (black) used by the printer (this process will hereinafter be referred to as a "color separating process"). Further, this process will be described in detail with reference to FIG. 4. Specifically, the present configuration indicates a process executed by, for example, a printer driver in a host computer as described below. However, this process may be executed by an image output apparatus such as a printer or may be shared by the host apparatus and the image output apparatus. The present invention is applicable to either of these forms as is apparent from the following description.

In FIG. 1, from input image signals expressed by a color system such as RGB or L*a*b*, a color material signal calculating process 101 calculates a combination of four color materials Y, M, C, and K for each pixel. Then, a color material use amount calculating process 102 calculates a total color material use amount for each combination of color materials calculated by the color material signal calculating process 101. The total color material use amount is the sum of the color material use amounts determined for inks Y, M, C, and K, respectively. In the present embodiment, the individual color material use amounts are calculated as 0 to 100% in a proportional relationship with a signal value 0 to 255 represented for each color component by 8-bit data. Here, a use amount of "A"% basically means that when that 8-bit signal is converted into ink ejection data through quantization such as binarization and this data is then used to print an image on a print sheet, ink dots are formed at the corresponding pixel at a probability of "A"% on the average. However, taking the permeability of the ink Y, M, C, or K into consideration, the color material use amount may be calculated as, for example, 0 to 80% in a proportional relationship with a signal value 0 to 255 depending on the kind of ink. Further, all the combinations of color materials for one input image signal correspond to a previously provided plurality of combinations of color materials, which indicate, for example, the same L*a*b* value as that for the input image signal but which indicate different signal values.

Then, a total color material use amount determining process 103 determines, in accordance with a predetermined target color, a total color material use amount, which is referenced in determining a combination of color materials for a color separating process. Then, a color material combination determining process 104 determines a combination of color materials Y', M', C', and K' based on the determined total color material use amount and then outputs this combination as color material data used by the printer of the present embodiment.

Figure 2:
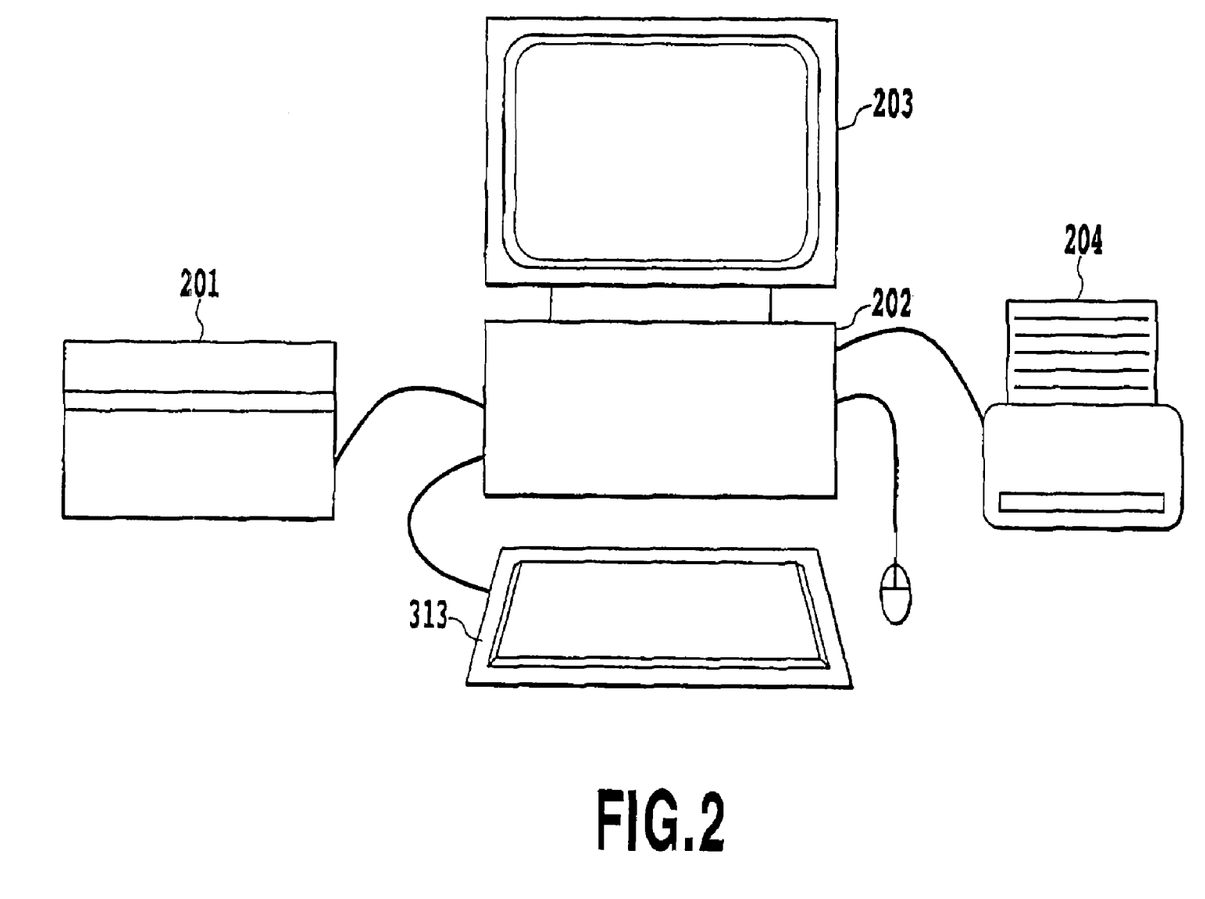
FIG. 2 is a diagram showing a specific image processing system that executes the image processing shown in FIG. 1.

FIG. 2 is a diagram showing a specific image processing system that executes the above image processing.

In this figure, reference numeral 201 denotes a spectrophotometer as an image signal input apparatus. Reference numeral 202 denotes a personal computer as a computer system. An image signal read by the spectrophotometer 201 is inputted to the personal computer 202. The personal computer 202 can then edit and store the image signal. It can also use a display 203 to display image signal information obtained by the edition or the like or can use a printer 204 as an image output apparatus to print the information. Further, reference numeral 313 denotes a keyboard and a mouse used by a user to input instructions on processing and control executed by the personal computer 202.

Figure 3:
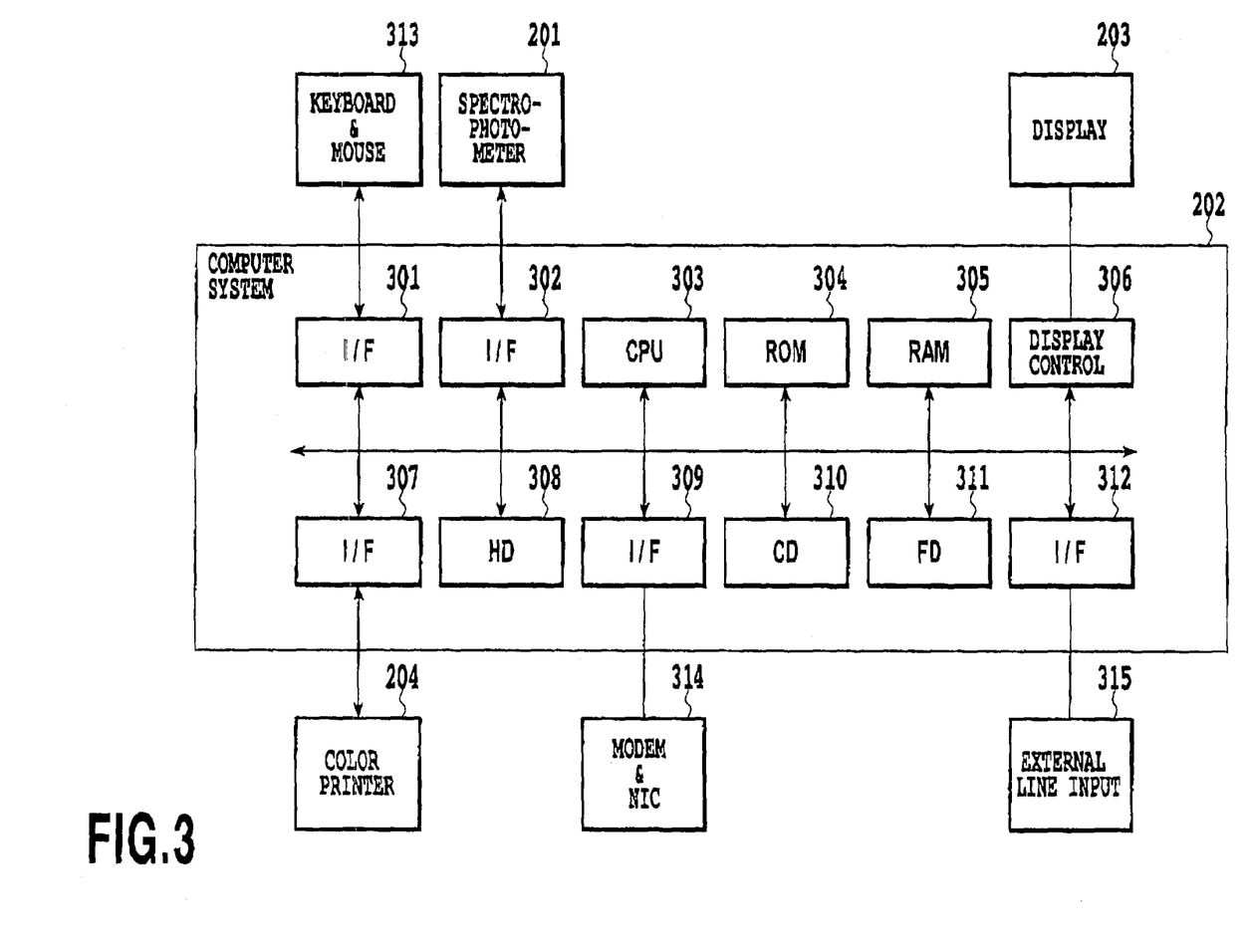
FIG. 3 is a block diagram showing main components of the system shown in FIG. 2, notably a personal computer.

FIG. 3 is a block diagram showing main components of the system shown in FIG. 2, especially of the personal computer 202.

In this figure, reference 301 denotes an interface (I/F) used to transmit and receive signals to and from the mouse and keyboard 313. Reference numeral 302 denotes also an interface (I/F) used to transmit and receive signals to and from the image input apparatus such as the spectrophotometer 201.

Reference numeral 303 denotes a CPU which controls, in accordance with programs, processing and operations performed by each element of the personal computer 202 and which execute predetermined processing. Reference numeral 304 denotes a ROM that stores the image processing shown in FIG. 1 and described later in FIG. 4, and the like. Reference numeral 305 denotes a RAM that temporarily stores programs and image data when the CPU executes the above processing or the like.

Reference numeral 306 denotes a display control device that controls the display device 203 displaying messages to an operator. Reference numeral 307 denotes an interface (I/F) used to connect the computer system 202 and the color printer 204 through signals. Reference numeral 308 denotes a hard disk (HD) which stores programs and image data to be transferred to the RAM 305 or the like for use and which saves processed image data. Reference numeral 309 denotes an interface (I/F) which connects, through signals, the computer system and transmission equipment 314 such as a modem or a network card which can transmit to external equipment various data to be retained in the respective areas in the computer system and receive various data from the external equipment. Reference numeral 310 denotes a CD drive that can read stored data from or write data in a CD (CD-R/CD-RW/DVD), an external storage medium. Reference numeral 311 denotes an FD drive that can similarly read data from and write data in an FD. If image editing programs or printer information or the like is stored in a CD, FD, DVD, or the like, these programs are installed in the HD 309 and transferred to the TAM 305 as required. Reference numeral 312 denotes a sound interface (I/F) to which an external line input 315 or a microphone is connected to receive external sound data.

Figure 4:
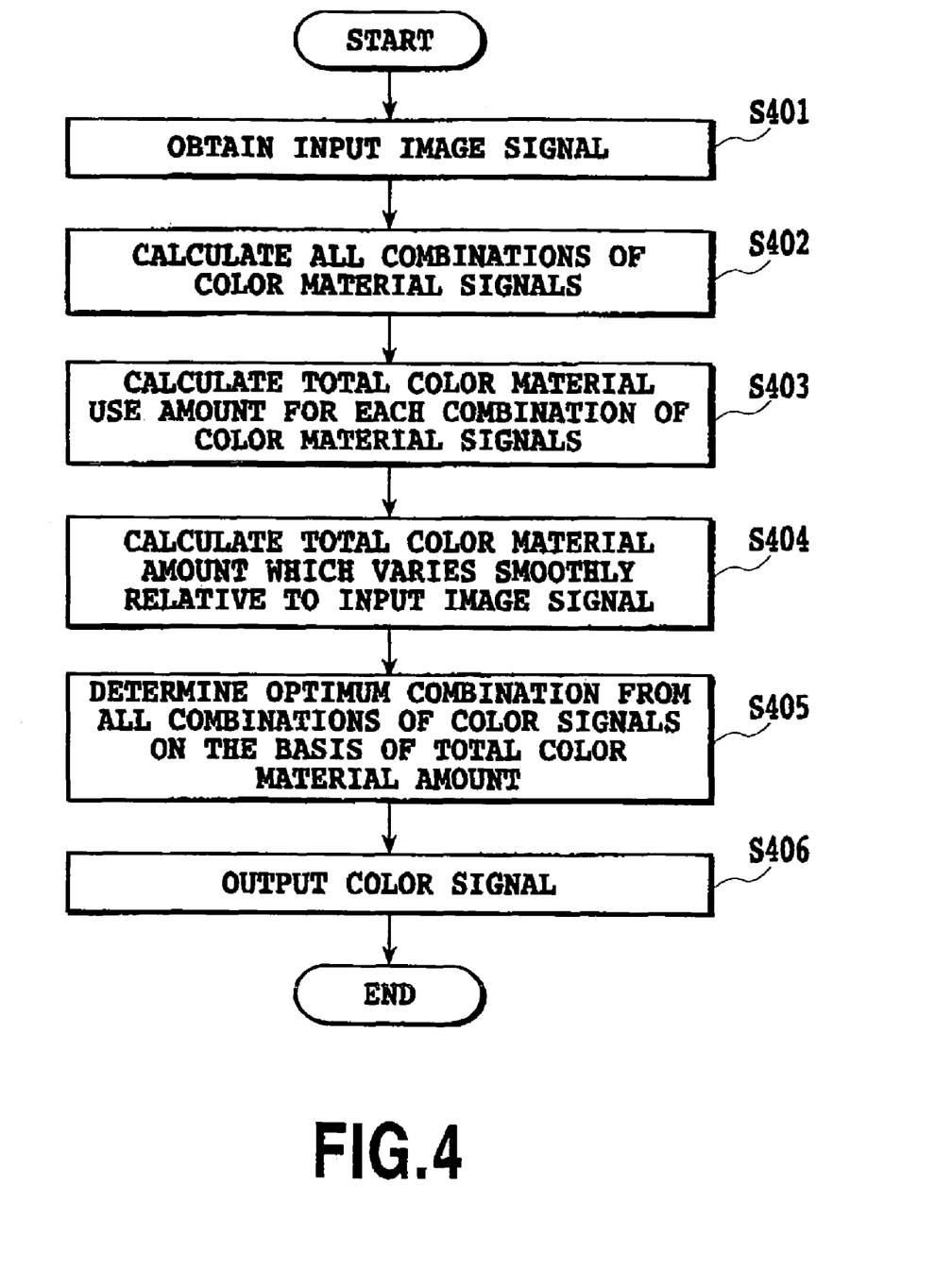
FIG. 4 is a flow chart showing a procedure of the image processing shown in FIG. 1, specifically a color separating process executed by the configuration shown in FIGS. 2 and 3.

FIG. 4 is a flow chart showing a procedure of the image processing shown in FIG. 1, especially of a color separation table generating process executed by the configuration shown in FIGS. 2 and 3. A computer executable program in which the procedure shown in the flow chart in FIG. 4 is described is previously stored in the ROM 304. Alternatively, a program stored in the external storage device 308 may be loaded onto the RAM 305 so that the CPU 303 can execute the program.

First, in step S401, an input image signal is obtained for each pixel. The input image signal is inputted using the spectrophotometer 201, shown in FIG. 3. Alternatively, the input image signal may be inputted by connecting a color image scanner (not shown) or the like to the I/O 302. In addition, the input image signal may be inputted from the external storage device 308, the CD drive 310, or the FD drive 311. Here, in the present embodiment, the input image signal is a value expressed by the L*a*b* color system. However, the color system may of course be RGB or the like as described above.

Then, in step S402, for the image signal inputted for each pixel, all the combinations of color material signals Y, M, C, and K are determined in association with the signal value of the image signal. The combinations are provided and stored in a predetermined memory in advance. All the combinations having the same signal value (L*a*b*) are retrieved from the memory as described above. The already provided combinations are obtained by, for example, equally dividing 8-bit signal values by eight for each of Y, M, C, and K, to output patches for 4,096 combinations of Y, M, C, and K by the printer 204 according to the present embodiment, and subjecting these patches to a colorimetry process.

Then, in step S403, the total color material use amount is calculated for each of the combinations of the color material signals determined in step S402. The total color material use amount can be obtained by summing, for each combination, the use amounts of the color materials determined from the corresponding signal values. The results of the calculation are stored in the RAM 305 or are also stored in the external storage device 308 if they require a large capacity.

Figure 5:
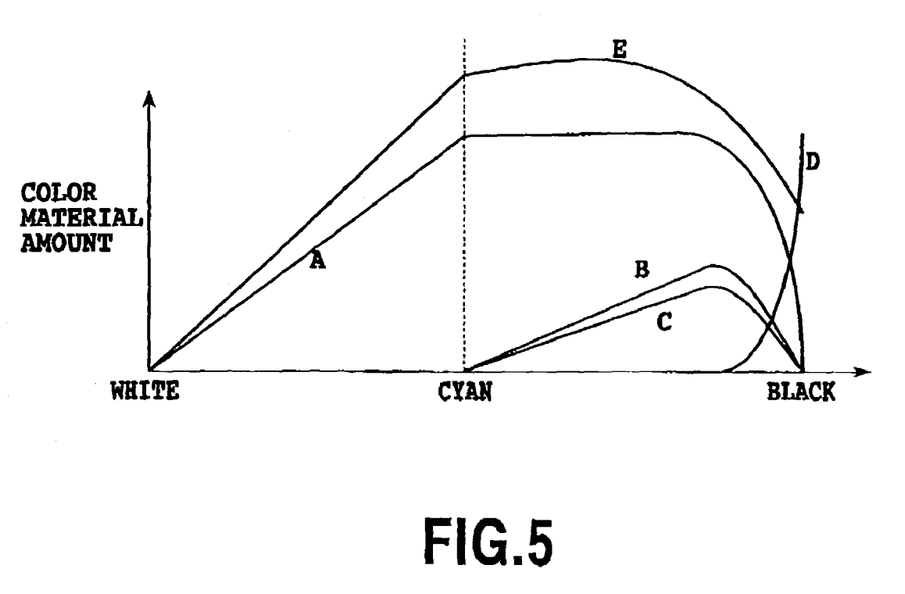
FIG. 5 is a diagram illustrating a total color material amount set by the color separating process.

Furthermore, in step S404, on the basis of a predetermined target color, a total color material use amount is determined which varies smoothly in accordance with a variation in the target color. For example, in accordance with the input image signal, one of the six hues, yellow, cyan, magenta, red, green, and blue which has the highest saturation is selected as a target color. For a combination of Y, M, C, and K that realizes the target color, a two-dimensional spline function or the like is used to set the total color material use amount (E) to vary smoothly relative to a variation of the target color, for example, from white through cyan to black in connection with the hue of cyan as shown in FIG. 5. That is, this set total color material use amount meets a smooth function. The total color material use amount may be determined and stored in a predetermined memory in advance. In this figure, reference character A denotes the amount of C (Cyan) ink, and reference character B denotes the amount of M (Magenta) ink. Reference character C denotes the amount of Y (Yellow) ink, reference character D denotes the amount of K (black) ink, and reference character E denotes the determined total color material use amount.

Then, in step S405, one of all the combinations of color material signals determined in step S403 is selected which corresponds to one of the total color material use amounts set in step S404 which is the same as the total color material use amount corresponding to the input image signal (L*a*b* value, a point on the axis of abscissa in FIG. 5) for the pixel being processed. If the combination corresponding to the same total color material use amount is not found, one can be determined by interpolating two nearby combinations of all the combinations of color material signals determined in step S403.

In step S406, the optimum combination of color material signals corresponding to the input image signal is outputted via the RAM 305. The CPU 303 outputs a print command to the printer 204 to finish step S406, thus completing a series of processes.

According to the above described embodiment, when color data for the Y, M, C, and K inks is being generated, the total color material use amount for each combination of generated Y, M, C, and K data varies smoothly. Accordingly, it is possible to prevent false contours (pseudo-contours) in printed images. Further, the total color material use amount is appropriately set to enable the prevention of ink overflow or the like resulting from the application of an excessive amount of ink.

Second Embodiment

The present embodiment relates to a configuration that allows the user or a service person to set the above described total color material use amount.

Figure 6:
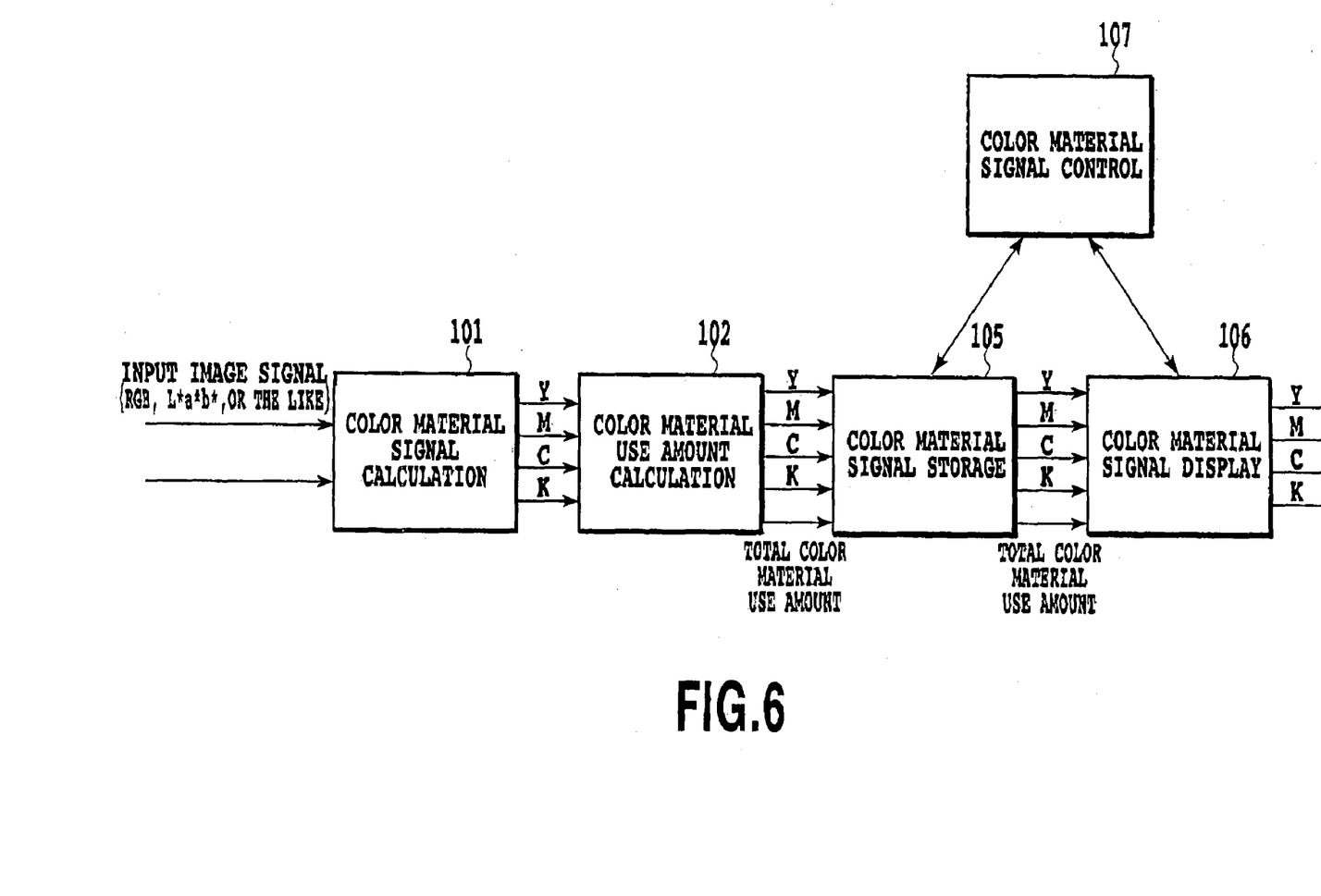
FIG. 6 is a block diagram showing an image processing configuration in a color printer according to another embodiment of the present invention.

FIG. 6 is a block diagram showing an image processing configuration for a color printer according to the present embodiment. Like FIG. 1 for the first embodiment, FIG. 6 shows a processing configuration that generates Y, M, C, and K data from a predetermined input image signal. In this figure, the same elements as those shown in FIG. 1 are denoted by the same reference numerals. Their detailed description is thus omitted. Specifically, in FIG. 6, a color material signal calculating process 101 calculates combinations of four color materials Y, M, C, and K from an input image signal, for each pixel. A color material use amount calculating process 102 calculates the use amounts of the individual color materials and the total color material use amount corresponding to the sum of the use amounts, for each combination of color materials calculated in the color material signal calculating process 101.

Then, a color material signal storing process 105 stores the use amounts of the individual color materials and the corresponding total color material use amount in association with each of the combinations of color materials determined by the color material use amount calculating process 102. Further, a color material signal displaying process 106 displays data such as the color material use amounts and total color material use amounts which is stored by the color material signal storing process 105. A color material signal control process 107 selects from the data such as the color material use amounts and total color use amounts which is stored by the color material signal storing process 105 and controls the color material signal displaying step 106 to display the selected data.

Figure 7:
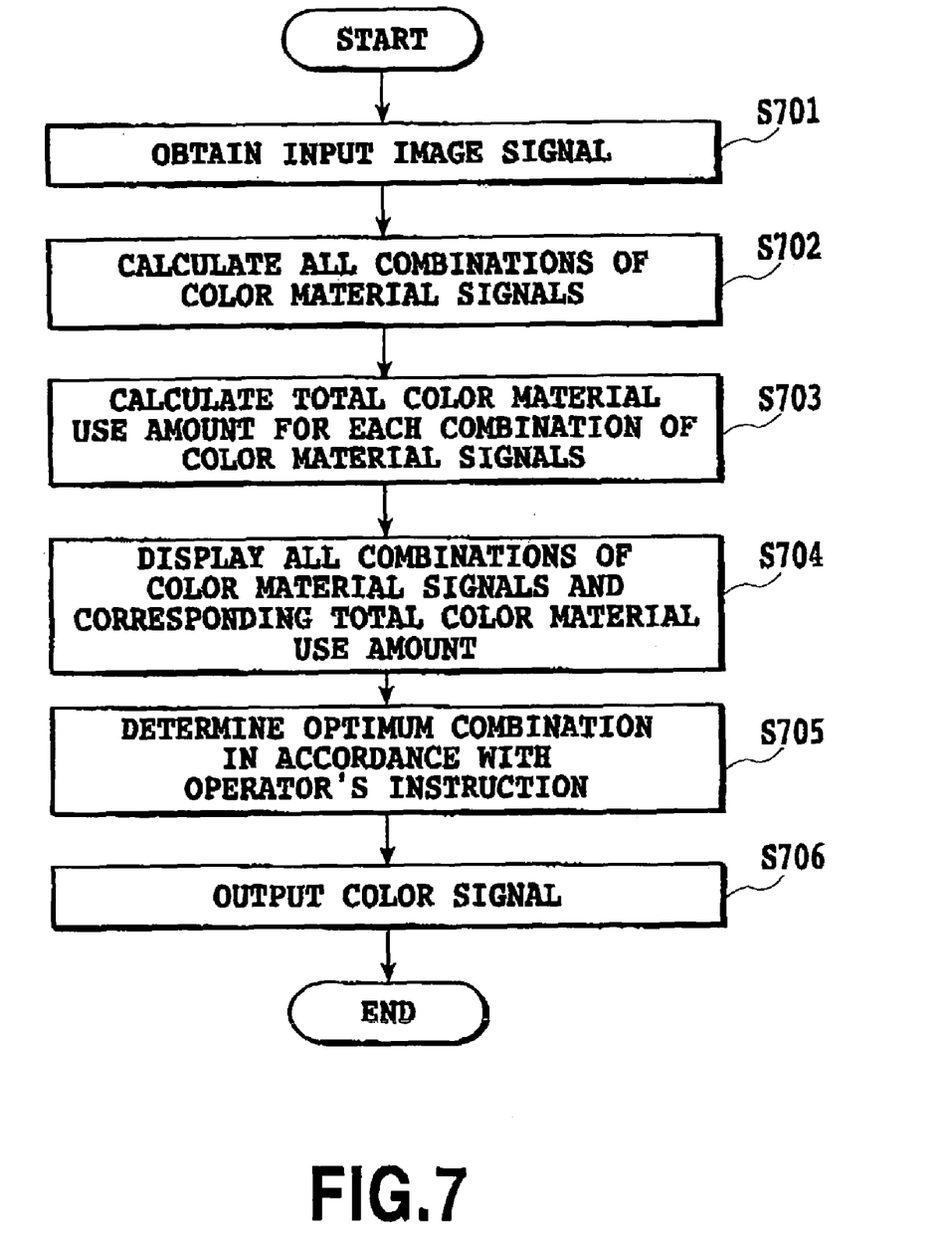
FIG. 7 is a flow chart of a procedure of a color separating process executed by the image processing configuration shown in FIG. 6.

FIG. 7 is a flow chart showing a procedure for a color separating process executed by the image processing configuration shown in FIG. 6.

In FIG. 7, in steps S701 to S703, a process is executed which is similar to that executed in steps S401 to S403 in FIG. 4, described in connection with the first embodiment. Then, in step S704, the total color material use amounts corresponding to all the combinations of color material signals stored in the RAM 305 or the like are displayed on the display 203. In step S705, a determination is made of the optimum combination, in accordance with an instruction from the operator, and in step S706, the optimum-combination color signal is outputted.

Figure 8:
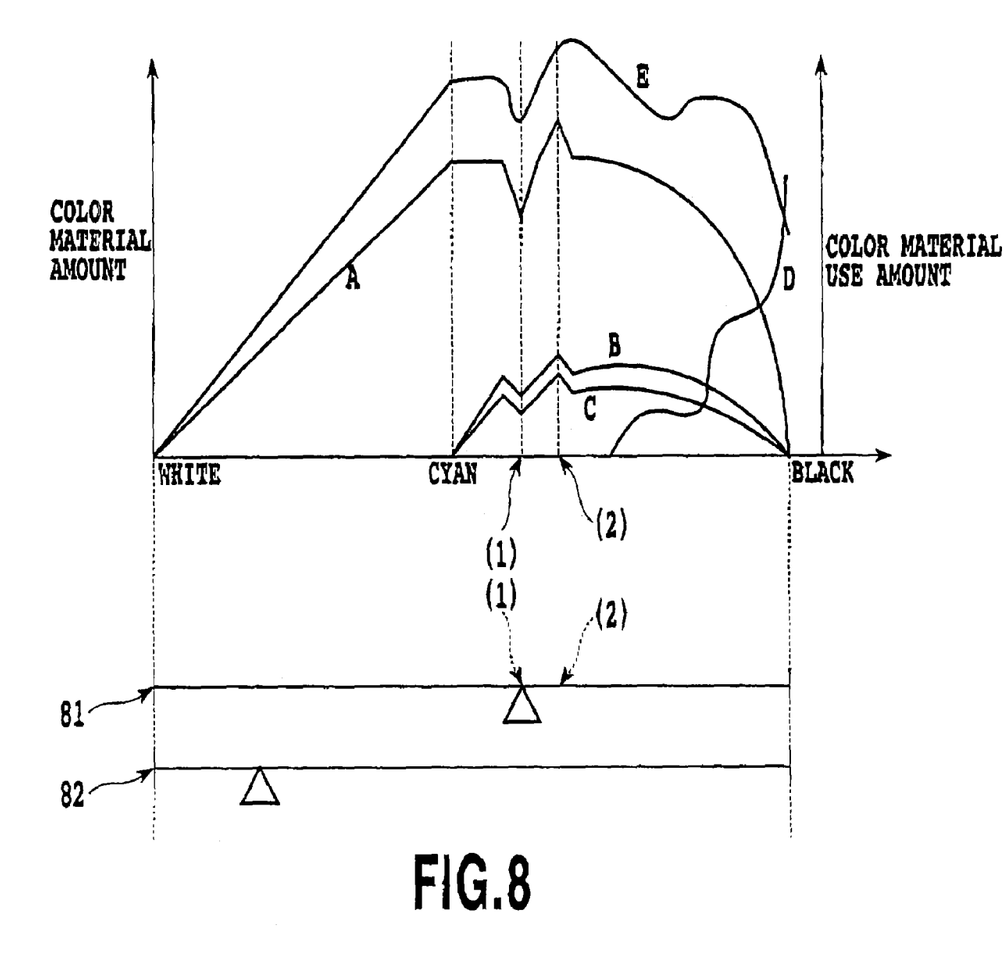
FIG. 8 is a diagram showing an example of display of total color material use amounts corresponding to all the combinations of color material signals in the processing shown in FIG. 7.
Figure 9:
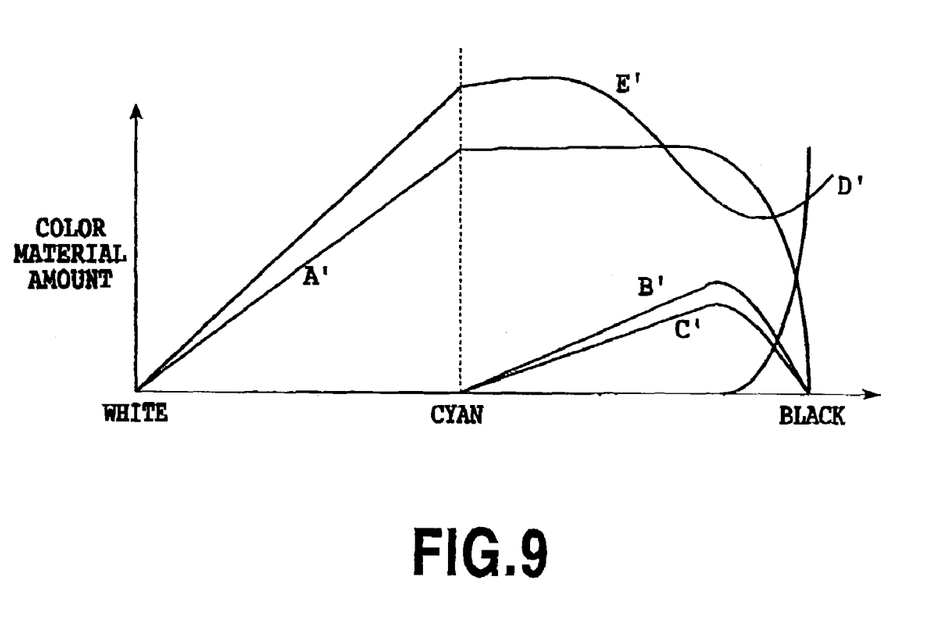
FIG. 9 is a diagram showing total color material use amounts for color material signals adjusted by the processing shown in FIG. 7.

FIG. 8 is a diagram showing an example of a display in the case in which the hue is cyan. This display is provided for each of a plurality of predetermined colors. For example, for each of six hues, i.e. yellow, cyan, magenta, red, green, and blue, the total color material use amounts of all the combinations of Y, M, C, and K corresponding to an L* value indicating a point on the abscissa in FIG. 8 are read from the RAM or the like. Then, the total color material use amounts of the respective combinations are displayed. Specifically, a plurality of total color use amounts are present for each point on the abscissa and are all displayed. FIG. 8 shows only one of the plurality of total color material use amounts displayed for each point on the abscissa. The figure also shows the amounts of individual color materials Y, M, C, and K.

In FIG. 8, with respect to a variation in the color of the hue cyan on the axis of abscissa, reference character A denotes the amount of C (Cyan) ink, reference character B denotes the amount of M (Magenta) ink, reference character C denotes the amount of Y (Yellow) ink, and reference character D denotes the amount of K (black) ink. Reference character E denotes the total color material use amount. Together with the above display, slider bar controllers 81 and 82 are displayed. The user or service person can operate these slider bar controllers by means of the keyboard or the mouse to adjust the total color material use amount. Operating the slider bar controller 81 enables a point on the abscissa to be specified. Points (1) and (2) are examples of points specified in this manner. Further, operating the slider bar 82 enables the specification of the total color material use amount corresponding to the specified point on the abscissa as described above. That is, the user or the like specifies one of the plurality of total color material use amounts displayed in association with the specified point which joins smoothly to the total color material use amounts of the preceding or succeeding points. For example, at a point at which the total amount sharply changes, as at points (1) and (2) shown in FIG. 8, the above operation is performed to generate a generally smooth variation. This allows the total color material use amount E' to vary smoothly with respect to a variation in the color of each hue. This setting is of course made before an image is inputted.

In step S705, the combination of Y, M, C, and K corresponding to the input image signal is determined on the basis of the total color material use amount set in accordance with the operation of the slider bars 81 and 82. Then in step S706, the combination of color material signals set in step S705 is outputted to the printer to finish the present color separating process.

Third Embodiment

In the above-described first and second embodiments, the combination of ink data is calculated every time an image input signal is inputted. However, the application of the present invention is not limited to this aspect.

Specifically, combinations of color material signals determined as described above for all or some of lattice points in color information such as RGB or L*a*b* may be stored as a look up table (LUT) in the ROM304, the external storage device 308, the CD drive 310, or the FD drive 311. Alternatively, the LUT may be used by the RAM 305 calling it via transmission equipment such as a modem or a network card which can receive various data from external equipment.

Figure 10:
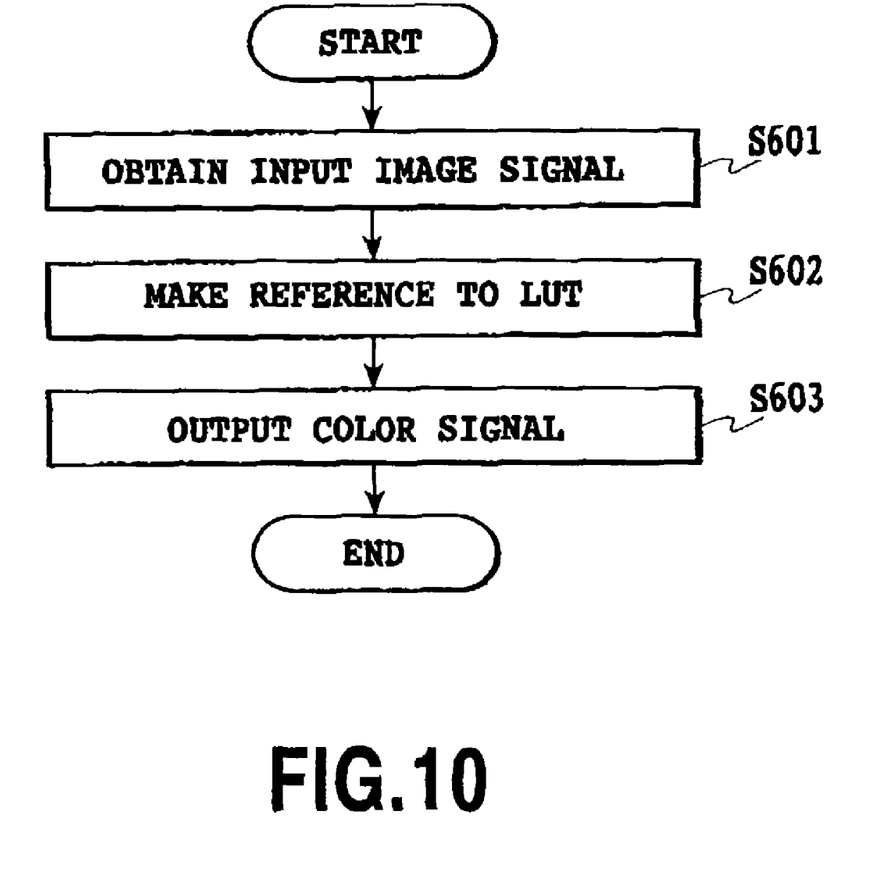
FIG. 10 is a flow chart showing a procedure of image processing using a color separation table according to the embodiment of FIG. 6.

In this figure, first, at step S601, an input image signal is obtained. The input image signal may be inputted by using the spectrophotometer 201, shown in FIG. 3, connecting a color image scanner or the like to the connection I/O 302 to the image input apparatus, or using the external storage device 308, the CD drive 310, or the FD drive 311. The inputted input image signal is temporarily stored in the RAM 305.

Then, in step S602, the optimum combination of the color material signals which corresponds to the inputted input image signal is determined with reference to the above LUT, called by the RAM 305. Then, in step S603, the combination of the color material signals from the LUT are outputted together with a print command to the printer 204.

Fourth Embodiment

In the above described embodiments, the four color materials Y (Yellow), M (Magenta), C (Cyan), and K (black) are used as the plurality of color materials. The application of the present invention is not limited to this aspect. That is, the manner of creating patches set in steps S402 and S702 may be changed so as to determine combinations of not only Y (Yellow), M (Magenta), C (Cyan), and K (black) but also Lm (Light Magenta), obtained by reducing the concentration of M (Magenta), and Lc (Light Cyan), obtained by reducing the concentration of C (Cyan). Thus, the present invention is also applicable to the use of these color materials.

Other Embodiments

Further, the present invention is not limited to an apparatus and a method realizing the above described embodiments. Embodiments are also included in the category of the present invention, in which program codes of software, which realize the above described embodiments, are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves shown in FIGS. 4, 7, and 10 implement the functions of the above described embodiments, so that the program codes themselves and means for supplying them to the computer, for example, a storage medium storing such program codes, constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where, after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments. Further, any configuration including at least one of various features described above is included in the range of the present invention.

As described above, according to the embodiments of the present invention, the combination of data for the plurality of kinds of color material which data corresponds to an inputted image signal is generated so that the total amount of plurality kinds of color material determined depending on the combination of the data meets a smooth function for the total color material use amount within the range of an image signal that can be inputted. Consequently, when an image is outputted to a printing medium such as a printing sheet, sharp changes can be prevented such as a discontinuous variation in color material use amount in the case that a variation in the density or hue of the image is to be realized.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. A color processing method of determining a combination of color material signals of a plurality of kinds of color materials for reproducing a color represented by an input color signal designated by three color signals, the method comprising:
using a processor to perform the steps of:
obtaining a plurality of combinations of color material signals, each of the combinations being capable of reproducing a color represented by the input color signal;
setting a function which represents a relation between color signals of target colors that change from white to black and a total use amount of the color material signals and in which a change in the total use amount of the color material signals of the input color signal is continuous with a change in the color signals of the target colors that change from white to black, wherein the function is set based on a color signal of the target colors corresponding to a color represented by the input color signal and a total use amount of the color material signals of the target colors;

calculating the total use amount of the color material signals corresponding to the input color signal by using the set function; and
determining the combination of color material signals corresponding to the input color signal in the plurality of color material signals based on the calculated total use amount of the color material signals.

2. A color processing method as claimed in claim 1, wherein the step of determining the combination includes determining the combination corresponding to the input color signal with reference to a table, which determines the combination of the plurality of kinds of color material so that the total use amount of the color materials is determined according to the combination of the plurality of kinds of color materials, and meets the function for the total use amount within a range for the input color signal.

3. A color processing method as claimed in claim 1, wherein the function is a spline function.

4. A color processing method as claimed in claim 3, wherein the step of setting the function includes displaying a function for a total use amount for a predetermined color on a display device and setting the function based on input by an operation on the display.

5. A color processing method as claimed in claim 1, wherein of the plurality of kinds of color materials comprise yellow, magenta, cyan, and black.

6. A color processing method as claimed in claim 1, wherein the plurality of kinds of color materials comprise yellow, magenta, cyan, black, and light magenta, having lower concentration than the magenta, and light cyan, having lower concentration than the cyan.

7. A color processing method as claimed in claim 1, wherein the color materials comprise inks.

8. A color processing method as claimed in claim 1, wherein the color materials comprise toners.

9. A color processing apparatus for determining a combination of color material signals of a plurality of kinds of color materials for reproducing a color represented by an input color signal designated by three color signals, comprising:
means for obtaining a plurality of combinations of color material signals, each of the combinations being capable of reproducing a color represented by the input color signal,
means for setting a function which represents a relation between color signals of target colors that change from white to black and a total use amount of the color material signals and in which a change in the total use amount of the color material signals of the input color signal is continuous with a change in the color signals of the target colors that change from white to black, wherein the function is set based on a color signal of the target colors corresponding to a color represented by the input color signal color and a total use amount of the color material signals of the target colors;
means for calculating the total use amount of the color material signals corresponding to the input color signal by using the set function; and
means for determining the combination of color material signals corresponding to the input color signal in the plurality of color material signals based on the calculated total use amount of the color material signals.

10. A storage medium storing a program to make a computer execute a color processing method of determining a combination of color material signals of a plurality of kinds of color materials for reproducing a color represented by an input color signal designated by three color signals, the method comprising the steps of:

obtaining a plurality of combinations of color material signals, each of the combinations being capable of reproducing a color represented by the input color signal;

setting a function which represents a relation between color signals of target colors that change from white to black and a total use amount of the color material signals and in which a change in the total use amount of the color material signals of the input color signal is continuous with a change in the color signals of the target colors that change from white to black, wherein the function is set based on a color signal of the target colors corresponding to a color represented by the input color signal and a total use amount of the color material signals of the target colors;

calculating the total use amount of the color material signals corresponding to the input color signal by using the set function; and determining the combination of color material signals corresponding to the input color signal in the plurality of color material signals based on the calculated total use amount of the color material signals.

11. A color processing method as claimed in claim 1, wherein the representative color is a color having a highest saturation in each of hues of colors of the plurality of kinds of color materials.

12. A color processing method as claimed in claim 1, wherein the determining step determines the combination of the color material signals by selecting a combination of the color material signals nearest to a combination of the color material signals corresponding to input color signal of the calculated total use amount, from the plurality of combinations of the plurality of kinds color materials.

* * * * *